United States Patent
Ma et al.

(10) Patent No.: US 9,206,065 B2
(45) Date of Patent: Dec. 8, 2015

(54) APPARATUS AND METHOD FOR BAKING GLASS SUBSTRATE

(75) Inventors: Tao Ma, Guangdong (CN); Tao Ding, Guangdong (CN); Ming Liu, Guangdong (CN); Tao Song, Guangdong (CN); Guodong Zhao, Guangdong (CN); Yijun Liu, Guangdong (CN)

(73) Assignee: SHENZHEN CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 2 days.

(21) Appl. No.: 13/641,664

(22) PCT Filed: Aug. 2, 2012

(86) PCT No.: PCT/CN2012/079573
§ 371 (c)(1),
(2), (4) Date: Oct. 16, 2012

(87) PCT Pub. No.: WO2014/005362
PCT Pub. Date: Jan. 9, 2014

(65) Prior Publication Data
US 2014/0007620 A1    Jan. 9, 2014

(30) Foreign Application Priority Data
Jul. 3, 2012   (CN) .......................... 2012 1 0226013

(51) Int. Cl.
| C03B 25/00 | (2006.01) |
| C03B 29/00 | (2006.01) |
| C03B 32/00 | (2006.01) |
| C03C 17/00 | (2006.01) |
| C03C 17/32 | (2006.01) |

(52) U.S. Cl.
CPC ............... *C03B 32/00* (2013.01); *C03C 17/001* (2013.01); *C03C 17/32* (2013.01); *C03C 2218/31* (2013.01)

(58) Field of Classification Search
CPC .......... C03B 25/00; C03B 29/00; C03B 32/00
USPC ........................................................ 65/29.19
See application file for complete search history.

(56) References Cited

U.S. PATENT DOCUMENTS

| 8,222,574 | B2 | 7/2012 | Sorabji | |
| 2003/0024269 | A1* | 2/2003 | Shepard et al. | 65/29.18 |
| 2006/0286807 | A1* | 12/2006 | Hwang et al. | 438/715 |

FOREIGN PATENT DOCUMENTS

| CN | 1745332 | 3/2006 |
| CN | 1973356 | 5/2007 |
| CN | 101231941 | 7/2008 |
| CN | 101598908 | 12/2009 |
| KR | 20040020419 | 3/2004 |

* cited by examiner

*Primary Examiner* — Matthew Daniels
*Assistant Examiner* — Cynthia Szewczyk
(74) *Attorney, Agent, or Firm* — Kirton McConkie; Evan R. Witt

(57) ABSTRACT

The present invention discloses an apparatus for baking a glass substrate, which includes: a baking oven, a support component, a temperature sensing device, a heating device, a cooling device, and a temperature controlling device. The present invention further discloses a method for baking a glass substrate. The present invention is capable of dynamically controlling the temperature of the support component, which contacts the glass substrate. The temperature of the glass substrate keeps identical and the temperature of the support component keep identical, so as to prevent a Mura defect appearing on the glass substrate.

5 Claims, 3 Drawing Sheets

APPARATUS AND METHOD FOR BAKING GLASS SUBSTRATE

FIELD OF THE INVENTION

The present invention relates a baking technology for a glass substrate, and especially to an apparatus and a method for baking a glass substrate.

BACKGROUND OF THE INVENTION

In conventional manufacturing processes of a glass substrate, polyimide (PI) solution on the glass substrate requires prebaking. A way of the baking is to radiate the glass substrate through infrared rays for heating the glass substrate to 90 degrees Celsius, thereby evaporating solvent of the PI solution to increase a density of the PI solution. In said baking process, support pins are usually employed to support the glass substrate. But since material of support pins are not heat-insulating completely, there is a difference of thermal conductivity existed between a contact region (contact area of support components on the glass substrate) and a noncontact region (noncontact area of the support components on the glass substrate). Thus, the glass substrate is heated unevenly, resulting in a "Mura" defect appearing on the glass substrate, and a product yield of the glass substrate is decreased.

In order to prevent the Mura defect appearing on the glass substrate, there were two conventional solutions as following. One is that the support pins are made of a material with a better heat-insulating performance, thereby reducing a temperature difference between the contact regions of the support pins and other regions. The other is that the support pins are controlled to alternately support the glass substrate for reducing time, which the support pins contact the glass substrate at the same places. That is, parts of the support pins are utilized to support the glass substrate first, and then the other support pins are utilized to support the glass substrate after a predetermined time.

Both said two solutions still can not prevent the Mura defect appearing on the glass substrate, and the reason for this is the following. Firstly, said two solutions can not preclude an existence of the temperature difference between the different regions (the contact regions of the support pins as well as the noncontact regions of the support pins). Secondly, in said two solutions, the way of using the support pins to support will make pressures of the contact regions between the glass substrate and the support pins too large, such that the glass substrate is deformed for making the glass substrate be heated unevenly, resulting the Mura defect appearing in the baking process. Thirdly, in said two solutions, because the support pins are needlelike, it is a disadvantage to keep flatness of the glass substrate during the baking process. It is easy to cause the Mura defect of a halo appearing.

Therefore, there is a significant need to provide a new technical solution for solving the technical problem of the Mura defect appearing on the glass substrate.

SUMMARY OF THE INVENTION

An objective of the present invention is to provide an apparatus for baking a glass substrate, and the apparatus can effectively prevent a Mura defect appearing on the glass substrate.

To achieve the foregoing objective, the present invention provides an apparatus for baking a glass substrate. The apparatus includes: a baking oven utilized to heat the glass substrate; a support component for supporting the glass substrate; a temperature sensing device for sensing a temperature of the glass substrate; a heating device utilized to heat the support component; a cooling device utilized to cool the support component; and a temperature controlling device utilized to receive temperature data transmitted from the temperature sensing device, and to control the heating device to heat the support component, or to control the cooling device to cool the support component according to the temperature data. The temperature sensing device includes: a first temperature sensor for sensing a first temperature data of the glass substrate, the first temperature data being a temperature on a first region of the glass substrate; and a second temperature sensor for sensing a second temperature data of the glass substrate, the second temperature data being a temperature on a second region of the glass substrate; the temperature sensing device electrically coupled to the temperature controlling device. The temperature controlling device is electrically coupled to the heating device and the cooling device. The baking oven heats the glass substrate through an infrared heater.

In the above-mentioned apparatus for baking a glass substrate, the temperature controlling device is further utilized to compare the first temperature data and the second temperature data.

In the above-mentioned apparatus for baking a glass substrate, under a condition that the first temperature data is larger than the second temperature data, the temperature controlling device is further utilized to control the heating device to heat the support component. Under a condition that the first temperature data is less than the second temperature data, the temperature controlling device is further utilized to control the cooling device to cool the support component.

In the above-mentioned apparatus for baking a glass substrate, the apparatus further includes: a third temperature sensor for sensing a third temperature data of the support component, the third temperature data being a temperature on the support component.

In the above-mentioned apparatus for baking a glass substrate, before the baking oven heats the glass substrate, the temperature controlling device is further utilized to control the heating device and the cooling device to adjust the temperature of the support component according to the third temperature data, so that the third temperature data is consistent with an oven temperature of the baking oven.

Another objective of the present invention is to provide an apparatus for baking a glass substrate, and the apparatus can effectively prevent a Mura defect appearing on the glass substrate.

To solve the above-mentioned problem, the present invention provides an apparatus for baking a glass substrate. The apparatus includes: a baking oven utilized to heat the glass substrate; a support component for supporting the glass substrate; a temperature sensing device for sensing a temperature of the glass substrate; a heating device utilized to heat the support component; a cooling device utilized to cool the support component; a temperature controlling device utilized to receive temperature data transmitted from the temperature sensing device, and to control the heating device to heat the support component, or to control the cooling device to cool the support component according to the temperature data.

In the above-mentioned apparatus for baking a glass substrate, the temperature sensing device includes: a first temperature sensor for sensing a first temperature data of the glass substrate, the first temperature data being a temperature on a first region of the glass substrate; and a second temperature sensor for sensing a second temperature data of the glass substrate, the second temperature data being a temperature on a second region of the glass substrate.

In the above-mentioned apparatus for baking a glass substrate, the temperature controlling device is further utilized to compare the first temperature data and the second temperature data.

In the above-mentioned apparatus for baking a glass substrate, under a condition that the first temperature data is larger than the second temperature data, the temperature controlling device is further utilized to control the heating device to heat the support component. Under a condition that the first temperature data is less than the second temperature data, the temperature controlling device is further utilized to control the cooling device to cool the support component.

In the above-mentioned apparatus for baking a glass substrate, the apparatus further includes: a third temperature sensor for sensing a third temperature data of the support component, the third temperature data being a temperature on the support component. Before the baking oven heats the glass substrate, the temperature controlling device is further utilized to control the heating device and the cooling device to adjust the temperature of the support component according to the third temperature data, so that the third temperature data is consistent with an oven temperature of the baking oven.

Yet another objective of the present invention is to provide a method for baking a glass substrate, and the method can effectively prevent a Mura defect appearing on the glass substrate.

To solve the above-mentioned problem, the present invention provides an method for baking a glass substrate. The method includes: a baking oven, a support component, a temperature sensing device, a heating device, a cooling device, and a temperature controlling device. The method includes the following steps of: (A) heating the glass substrate by the baking oven;(B) sensing a temperature of the glass substrate by the temperature sensing device; (C) receiving temperature data transmitted from the temperature sensing device, and controlling the heating device the heating device to heat the support component or controlling the cooling device to cool the support component by the temperature controlling device according to the temperature data.

In the above-mentioned method for baking a glass substrate, the temperature sensing device includes: a first temperature sensor and a second temperature sensor. The step (B) further includes the following steps of: (b1) sensing a first temperature data of the glass substrate by the first temperature sensor, the first temperature data being a temperature on a first region of the glass substrate; and (b2) sensing a second temperature data of the glass substrate by the second temperature sensor, the second temperature data being a temperature on a second region of the glass substrate.

In the above-mentioned method for baking a glass substrate, the step (C) further includes the following step of: (c1) comparing the first temperature data and the second temperature data by the temperature controlling device.

In the above-mentioned method for baking a glass substrate, the step (C) further includes the following steps of: (c2) controlling the heating device to heat the support component by the temperature controlling device under a condition that the first temperature data is larger than the second temperature data; (c3) controlling the cooling device to cool the support component by the temperature controlling device under a condition that the first temperature data is less than the second temperature data.

In the above-mentioned method for baking a glass substrate, the temperature sensing device further includes a third temperature sensor. the step (C) further comprises the following step of: (c4) sensing a third temperature data of the support component by the third temperature sensor before the baking oven heats the glass substrate, the third temperature data being a temperature on the support component, controlling the heating device and the cooling device to adjust the temperature of the support component according to the third temperature data by the temperature controlling device, so that the third temperature data is consistent with an oven temperature of the baking oven.

In comparison with the prior art, the temperature sensor (the first temperature sensor, the second temperature sensor and the third temperature sensor) is utilized to sense the temperature of the glass substrate and the temperature of the support component that contacts the glass substrate, so the temperature value on every region of the whole glass substrate and the temperature value of the support component can be dynamically informed, thereby obtaining the temperature difference between the glass substrate and the support component. Meanwhile, the heating device or the cooling device is controlled according to the difference. Hence, the temperature of the support component, which contacts the glass substrate, can be dynamically controlled, so that the temperature of the glass substrate keeps identical and the temperature of the support component keep identical, so as to prevent a Mura defect appearing on the glass substrate. Specifically, the technical solution of the present invention precludes phenomena of a pin Mura defect existing on the glass substrate supported by the conventional support pins and other Mura defects. In addition, the technical solution of the present invention further precludes a phenomenon of the deformation of the glass substrate stemming from the supporting of the support pins. Therefore, the glass substrate will be not heated unevenly due to the deformation, resulting in the Mura defect appearing. In addition, in the technical solution of this invention, the support component is not restricted to be needlelike, so the contact area between the support component and the glass substrate can be increased, thereby increasing the flatness of the glass substrate in the baking process. A probability of the halo Mura defect appearing are reduced to a certain extent.

It is to be understood that both the foregoing general description and the following detailed description of the present invention are exemplary and explanatory and are intended to provide further explanation of the invention as claimed.

DETAILED DESCRIPTION OF THE PREFERRED EMBODIMENTS

Descriptions of the following embodiments refer to attached drawings which are utilized to exemplify specific embodiments.

Figure 1:
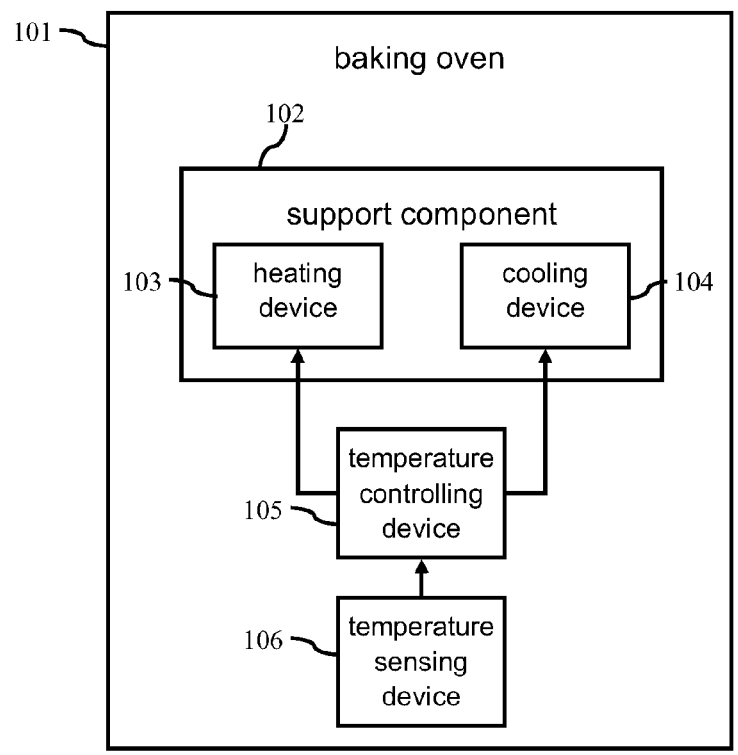
FIG. 1 is a block diagram illustrating an apparatus for baking a glass substrate in accordance with the present invention.

Referring to FIG. 1, FIG. 1 is a block diagram illustrating an apparatus for baking a glass substrate in accordance with the present invention. The apparatus of the present invention for baking a glass substrate includes a baking oven 101, a support component 102, a temperature controlling device 105, a temperature sensing device 106, a heating device 103, and a cooling device 104. The temperature sensing device 106 is electrically coupled to the temperature controlling device 105. The temperature controlling device 105 is electrically coupled to the heating device 103 and the cooling device 104. The baking oven 101 is utilized to receive the glass substrate and to heat the glass substrate. Specifically, the baking oven 101 heats the glass substrate through an infrared heater (not shown). The support component 102 is disposed within the baking oven 101 for supporting the glass substrate. A portion of the support component 102 contacts the glass substrate can be needlelike, and also can be planar. The support component 102 is made of a material with a better thermal conductivity, such as metal. The temperature sensing device 106 is disposed in the baking oven 101 for sensing temperatures of the glass substrate and the support component 102. The temperature controlling device 105 is utilized to receive temperature data of the sensed glass substrate of the temperature sensing device 106, and to control the heating device 103 to heat the support component 102, or to control the cooling device 104 to cool the support component 102 according to the temperature data. The heating device 103 is disposed within the baking oven 101. Specifically, the heating device 103 is placed at an inside of the support component 102 or on a surface of the support component 102, or coupled to the support component 102. The heating device 103 is utilized to heat the support component 102. The cooling device 104 is disposed within the baking oven 101. Specifically, the cooling device 104 is placed at an inside of the support component 102 or on a surface of the support component 102, or coupled to the support component 102. The heating device 103 is utilized to cool the support component 102.

Figure 2:
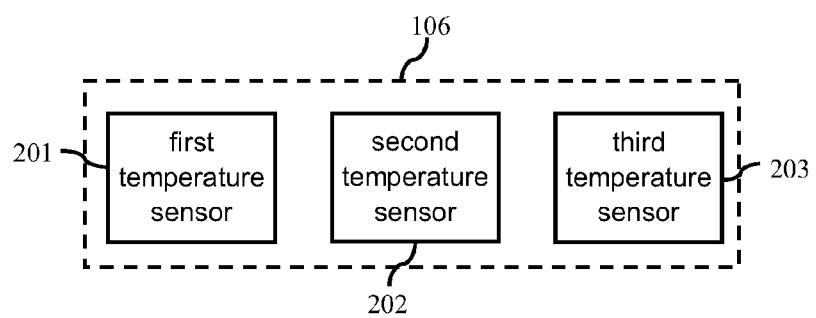
FIG. 2 is a block diagram illustrating the temperature sensing device in FIG. 1.

Referring to FIG. 2, FIG. 2 is a block diagram illustrating the temperature sensing device 106 in FIG. 1. The temperature sensing device 106 of the present invention includes a first temperature sensor 201, a second temperature sensor 202, and a third temperature sensor 203. All of the first temperature sensor 201, the second temperature sensor 202 and the third temperature sensor 203 are electrically coupled to the temperature controlling device 105. The first temperature sensor 201 is disposed near a first region (a region of the glass substrate without contacting the support component 102) of the surface of the glass substrate. Specifically, the first temperature sensor 201 can be an infrared temperature sensor, which is disposed above or below the glass substrate, and keeps a certain distance from the glass substrate for sensing a temperature of the first region (the region of the glass substrate without contacting the support component 102) of the glass substrate. Said temperature is recorded as first temperature data. The first temperature data are transmitted to the temperature controlling device 105 by the first temperature sensor 201. The second temperature sensor 202 is disposed near a second region (a region of the glass substrate contacting the support component 102) of the surface of the glass substrate. Specifically, the second temperature sensor 202 also can be an infrared temperature sensor, which is disposed above a second region (a region of the glass substrate contacting the support component 102) of the glass substrate, and keeps a certain distance from the glass substrate for sensing a temperature of the second region (the region of the glass substrate without contacting the support component 102) on the glass substrate. Said temperature is recorded as second temperature data. The second temperature data are transmitted to the temperature controlling device 105 by the second temperature sensor 202. The third temperature sensor 203 is disposed on the surface or the inside of the support component 102. Specifically, the third temperature sensor 203 is a thermocouple. Surely it can be other types of the temperature sensors, such as a thermistor, etc. The third temperature sensor 203 is disposed above the support component 102 and near a portion that the support component 102 contacts the glass substrate, thereby sensing a temperature of the support component 102. Said temperature is recorded as third temperature data. The third temperature data are transmitted to the temperature controlling device 105 by the third temperature sensor 203.

The operating principle of the apparatus for baking a glass substrate of the present invention is as follows. The temperature sensing device 106 is utilize to detect the temperature of the second region (the region of the glass substrate contacting the support component 102) on the glass substrate and the temperature of the first region (the region of the glass substrate without contacting the support component 102), and then to obtain the difference between the temperatures of the two regions. The temperature of the second region (the region of the glass substrate contacting the support component 102) on the glass substrate is adjusted by controlling the heating device 103 or the cooling device 104, thereby making the temperature of the second region equal to the temperature of the first region (the region of the glass substrate without contacting the support component 102). Specifically, if the temperature of the second region (the region of the glass substrate contacting the support component 102) on the glass substrate is larger than the temperature of the first region (the region of the glass substrate without contacting the support component 102), the temperature controlling device 105 controls the cooling device 104 to cool the support component 102 until the temperatures of the two regions are equal; if the temperature of the second region (the region of the glass substrate contacting the support component 102) on the glass substrate is less than the temperature of the first region (the region of the glass substrate without contacting the support component 102), the temperature controlling device 105 controls the heating device 103 to heat the support component 102 until the temperatures of the two regions are equal. Accordingly, the temperature of the second region (the region of the glass substrate contacting the support component 102) on the glass substrate keeps identical with the temperature of the first region (the region of the glass substrate without contacting the support component 102) in real time. When the first temperature data and the second temperature data are equal, if the third temperature data is larger than the first temperature data, the temperature controlling device 105 controls the cooling device 104 to cool the support component 102 until the third temperatures data is equal to the first temperature data; if the third temperature data is less than the first temperature data, the temperature controlling device 105 controls the heating device 103 to heat the support component 102 until the third temperatures data is equal to the first temperature data.

Figure 3:
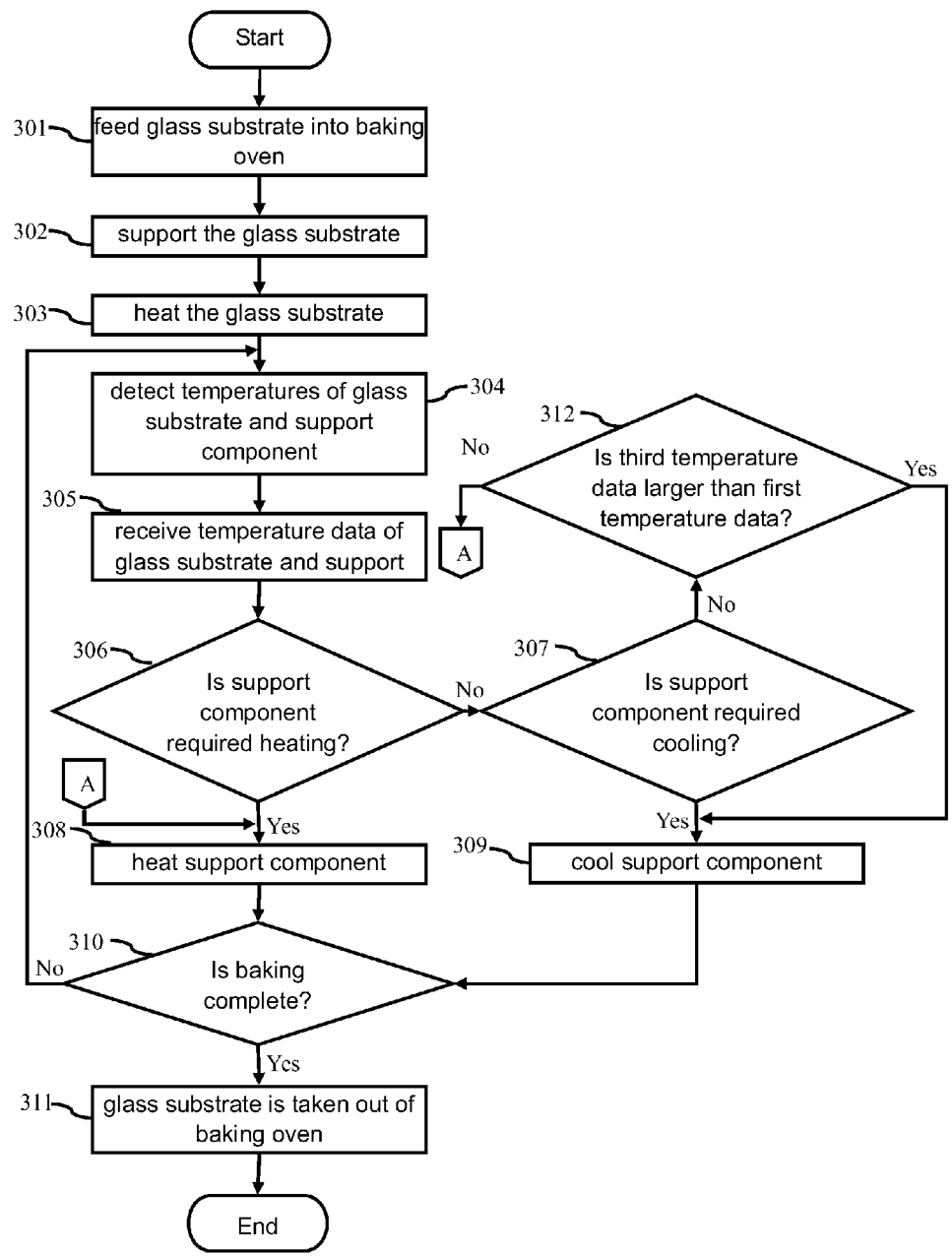
FIG. 3 is a flow chart illustrating a method for baking a glass substrate according to the present invention.
Figure 4:
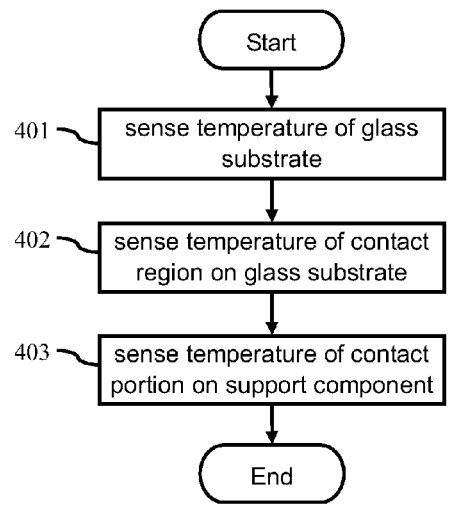
FIG. 4 is a flow chart illustrating a step of sensing the temperature of the glass substrate and the temperature of the support component in FIG. 3.

Referring to FIG. 3 and FIG. 4, FIG. 3 is a flow chart illustrating a method for baking a glass substrate according to the present invention; FIG. 4 is a flow chart illustrating a step of sensing the temperature of the glass substrate and the temperature of the support component 102 in FIG. 3. At step 301, the oven temperature of the baking oven 101 is regulated to 23 degrees Celsius, and the glass substrate is fed into the baking oven 101. At step 302, the support component 102 is utilized to support the glass substrate. At step 303, the baking oven 101 is utilized to heat the glass substrate. At step 304, the temperature sensing device 106 detects the temperature of the glass substrate and the temperature of the support component 102, and transmits the temperature data of the glass substrate and the support component 102 to the temperature controlling device 105. Specifically, at step 401 as shown in FIG. 4, the first temperature sensor 201 senses the temperature of the first region (the region of the glass substrate without contacting the support component 102) on the glass substrate for obtaining the first temperature data, and transmits the first temperature data to the temperature controlling device 105. At step 402, the second temperature sensor 202 senses the temperature of the second region (the region of the glass substrate without contacting the support component 102) on the glass substrate for obtaining the second temperature data, and transmits the second temperature data to the temperature controlling device 105. At step 403, the third temperature sensor 203 senses the temperature of the support component 102 for obtaining the third temperature data, and transmits the third temperature data to the temperature controlling device 105. At step 305, the temperature controlling device 105 receives the temperature data (the first temperature data and the second temperature data) of the glass substrate and the temperature data (the third temperature data) of the support component 102. At step 306, the temperature controlling device 105 determines whether heating the support component 102 is required, that is, whether the first temperature data is larger than the second temperature data, if so, then entering step 308, if not, then entering step 307. At step 307, the temperature controlling device 105 determines whether cooling the support component 102 is required, that is, whether the first temperature data is less than the second temperature data, if so, then entering step 309, if not, then entering step 312 under condition of the first temperature data being equal to the second temperature data. At step 312, the temperature controlling device 105 determines whether the third temperature data is larger than the first temperature data, if so, then entering step 309, if not, then entering step 308. At step 308, the temperature controlling device 105 controls the heating device 103 to heat the support component 102. In the process of heating, the temperature controlling device 105 performs step 310. At step 309, the temperature controlling device 105 controls the cooling device 104 to cool the support component 102. In the process of cooling, the temperature controlling device 105 performs step 310. At step 310, the temperature controlling device 105 determines whether the baking of the baking oven 101 has been completed, if so, then entering step 311, if not, then returning to 304. At step 311, the temperature controlling device 105 controls the cooling device 104 to cool the support component 102, and the glass substrate is taken out of the baking oven 101.

Figure 5:
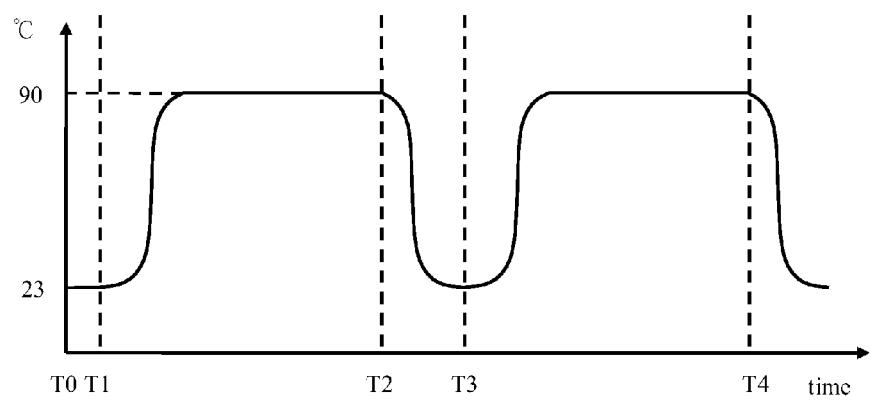
FIG. 5 is a schematic drawing illustrating a temperature variation of the support component in the apparatus for baking a glass substrate according to the present invention.

Referring to FIG. 5, FIG. 5 is a schematic drawing illustrating a temperature variation of the support component 102 in the apparatus for baking a glass substrate according to the present invention. During T0 to T1, one glass substrate is placed on the support component 102 of the baking oven 101. Meanwhile, the oven temperature of the baking oven 101 is 23 degrees Celsius. The third temperature sensor 203 senses a temperature of a portion of the support component 102 contacting the glass substrate, so as to obtain a third temperature data. The temperature controlling device 105 controls the heating device 103 or the cooling device 104 to heat or cool the support component 102 according to the third temperature data, so that the temperature of the support component 102 is the oven temperature 23 degrees Celsius. Specifically, if the temperature of the support component 102 is higher than 23 degrees Celsius, the temperature controlling device 105 continues controlling the cooling device 104 to cool the support component 102 until the third temperatures data is equal to 23 degrees Celsius. if the temperature of the support component 102 is lower than 23 degrees Celsius, the temperature controlling device 105 controls the heating device 103 to heat the support component 102 until the third temperatures data is equal to 23 degrees Celsius. During T1 to T2, the baking oven 101 heats the glass substrate, so that the oven temperature is raised to 90 degrees Celsius form 23 degrees Celsius, and then the oven temperature keeps 90 degrees Celsius. During the process, the second temperature sensor 202 senses the temperature of the second region (the region of the glass substrate without contacting the support component 102) on the glass substrate for obtaining the second temperature data. The first temperature sensor 201 senses the temperature of the first region (the region of the glass substrate without contacting the support component 102) on the glass substrate for obtaining the first temperature data. The temperature controlling device 105 compares the first temperature data and the second temperature data. If the first temperature data is larger than the second temperature data, the temperature controlling device 105 controls the heating device 103 to heat the support component 102, thereby heating the second region (the region of the glass substrate contacting the support component 102) of the glass substrate. If the first temperature data is less than the second temperature data, the temperature controlling device 105 controls the cooling device 104 to cool the support component 102, thereby cooling the second region (the region of the glass substrate contacting the support component 102) of the glass substrate, so that the temperature of every region on glass substrate is the same. During the process, the third temperature sensor 203 senses the temperature of the support component 102, so as to obtain the third temperature data. Under a condition that the temperature of the second region (the region of the glass substrate contacting the support component 102) on the glass substrate is the same to the temperature of the first region (the region of the glass substrate without contacting the support component 102), that is, the first temperature data is equal to the second temperature data, if the third temperature data is larger than the first temperature data, the temperature controlling device 105 controls the cooling device 104 to cool the support component 102 until the third temperatures data is equal to the first temperature data. If the third temperature data is less than the first temperature data, the temperature controlling device 105 controls the heating device 103 to heat the support component 102 until the third temperatures data is equal to the first temperature data. During T2 to T3, the baking oven 101 cools the glass substrate, so that the oven temperature falls to 23 degrees Celsius form 90 degrees Celsius. The third temperature sensor 203 senses the temperature of the support component 102, so as to obtain the third temperature data. The temperature controlling device 105 controls the cooling device 104 to cool the support component 102 according to the third temperature data. During the process, the temperature of the support component 102 keeps identical with the temperature of each of the regions. The baked glass substrate is taken out of the baking oven 101, and another glass substrate without baking is fed into the baking oven 101. The operation from T3 to T4 is similar to the operation from T1 to T2, and the baking of the next glass substrate can be achieved by repeating the operation from T1 to T3.

In comparison with the prior art, the present invention employs the temperature sensing device 106 (the first temperature sensor 201, the second temperature sensor 202 and the third temperature sensor 203) is utilized to sense the temperature of each region of the glass substrate and the temperature of the support component 102 that contacts the glass substrate, so the temperature value on every region of the whole glass substrate and the temperature value of the support component 102 can be dynamically informed, thereby obtaining the temperature difference of each region on the glass substrate. Meanwhile, the heating device 103 or the cooling device 104 is controlled according to the difference, so the temperature of the support component 102 contacting the glass substrate can be controlled dynamically. In the whole baking process, the temperature of each region on the glass substrate keeps identical, thereby effectively prevent the Mura defect appearing on the glass substrate. Specifically, the technical solution of the present invention precludes phenomena of a pin Mura defect existing on the glass substrate supported by the conventional support pins and other Mura defects. In addition, the temperature of the support component keeps identical with the glass substrate in real time, so the support component of the present invention does not need to be needlelike. Instead, the contact area between the support component and the glass substrate can be enlarged, so the technical solution of the present invention precludes the phenomenon of the deformation of the glass substrate stemming from the supporting of the support pins. Therefore, the glass substrate will be not heated unevenly due to the deformation, resulting in the Mura defect appearing. In addition, in the technical solution of this invention, the support component 102 is not restricted to be needlelike, so the contact area between the support component 102 and the glass substrate can be increased, thereby increasing the flatness of the glass substrate in the baking process. The probability of the halo Mura defect appearing are reduced to a certain extent.

While the preferred embodiments of the present invention have been illustrated and described in detail, various modifications and alterations can be made by persons skilled in this art. The embodiment of the present invention is therefore described in an illustrative but not restrictive sense. It is intended that the present invention should not be limited to the particular forms as illustrated, and that all modifications and alterations which maintain the spirit and realm of the present invention are within the scope as defined in the appended claims.

What is claimed is:

1. An apparatus for baking a glass substrate, comprising:
    a baking oven utilized to heat the glass substrate;
    a support component for supporting the glass substrate;
    a temperature sensing device for sensing a temperature of the glass substrate;
    a heating device placed at an inside or on a surface of the support component, or coupled to the support component, utilized to heat the support component;
    a cooling device utilized to cool the support component;
    and a temperature controlling device utilized to receive temperature data transmitted from the temperature sensing device, and to control the heating device to heat the support component, or to control the cooling device to cool the support component according to the temperature data;
    wherein the temperature sensing device comprises:
        a first temperature sensor for sensing a first temperature data of the glass substrate, the first temperature data being a temperature on a first region of the glass substrate, wherein the first region is a region of the glass substrate without contacting the support component;
        a second temperature sensor for sensing a second temperature data of the glass substrate, the second temperature data being a temperature on a second region of the glass substrate, wherein the second region is a region of the glass substrate contacting the support component, and wherein the second temperature sensor is disposed above the second region; and
        a third temperature sensor disposed inside the support component and near a portion that the support component contacts the glass substrate for sensing a third temperature data of the support component;
    the temperature sensing device electrically coupled to the temperature controlling device;
    the temperature controlling device electrically coupled to the heating device and the cooling device;
    the baking oven heating the glass substrate through an infrared heater.

2. The apparatus for baking a glass substrate according to claim 1, wherein the temperature controlling device is further utilized to compare the first temperature data and the second temperature data.

3. The apparatus for baking a glass substrate according to claim 2, wherein under a condition that the first temperature data is larger than the second temperature data, the temperature controlling device is further utilized to control the heating device to heat the support component; under a condition that the first temperature data is less than the second temperature data, the temperature controlling device is further utilized to control the cooling device to cool the support component.

4. The apparatus for baking a glass substrate according to claim 3, wherein, the third temperature data being a temperature on the support component.

5. The apparatus for baking a glass substrate according to claim 4, wherein before the baking oven heats the glass substrate, the temperature controlling device is further utilized to control the heating device and the cooling device to adjust the temperature of the support component according to the third temperature data, so that the third temperature data is consistent with an oven temperature of the baking oven.

* * * * *